United States Patent Office

Re. 24,017
Reissued June 7, 1955

24,017

METHOD OF COATING AND DRAWING METAL AND COMPOSITION THEREFOR

John A. Henricks, Lakewood, Ohio

No Drawing. Original No. 2,588,234, dated March 4, 1952, Serial No. 193,290, October 31, 1950. Application for reissue March 1, 1954, Serial No. 413,490

21 Claims. (Cl. 148—6.15)

Matter enclosed in heavy brackets [ ] appears in the original patent but forms no part of this reissue specification; matter printed in italics indicates the additions made by reissue.

This application is a continuation-in-part of my copending application Serial No. 665,905 filed April 29, 1946, *now abandoned.* The invention relates to the lubrication of sliding metal surfaces. In particular, it relates to the treatment and lubrication of surfaces under conditions of extreme pressure and surface temperature as encountered in the drawing and deforming of metals such as steel.

Ordinary lubricating oils fail to give satisfactory performance characteristics in the drawing and deforming of harder metals such as steel with the result that tearing of the metal or galling of the dies frequently occurs. Even extreme pressure lubricating oils are unsatisfactory for this purpose and are not recommended. The accepted theory is that the failure of such lubricants is due to a squeezing-out of the lubricants from between the work and die because of the extreme pressure used. Accordingly, to counteract this extreme pressure and to prevent the squeezing-out of lubricants, it has been the general practice to utilize as drawing compositions lubricants containing infusible pigments such as clay, lime, mica, calcium or magnesium carbonates, titanium dioxide and graphite. The function of such pigment is to separate the die and the workpiece at points of extreme deformation and intimate contact when the pressure or temperature is too great to be withstood by the organic constituents of the lubricating material. While such compositions do function better than the prior non-pigmented materials, an examination of the work drawn with the aid of such drawing compositions discloses minute particles of pigments embedded therein and a surface with an undesirable dull finish.

An additional objection to infusible pigment fillers is their abrasive or lapping action which increases friction and oil temperatures during the drawing operation.

It has been established (Bowden and Ridler in Proceedings of the Royal Society 154,640; 1936) that in sliding friction between dry metallic surfaces the frictional junction reaches and maintains the melting point of the lower melting metal. This readily explains the galling of dies and the welding and seizure of moving parts. From this it can be seen that the failure of a drawing lubricant may well be caused by high temperature destruction or carbonization of the lubricant with the resultant galling and seizure instead of pressure squeezing-out the material from the working surfaces as previously believed.

From this it follows that for the most satisfactory drawing and working of metal, effective lubrication throughout the entire temperature range below the melting point of the work or die is desirable. Furthermore, neither the drawing lubricant nor the surface of the metal should contain any solids capable of scratching the surface of the metal.

An object of the present invention is to provide a method of drawing metal wherein the metal is lubricated throughout all temperatures below its welding point so that relatively smooth working of the metal is facilitated and there is no galling, seizing, or scratching of the metal or die and a smooth shiny surface is produced on the metal.

A further object of the present invention is to utilize a drawing lubricant containing ingredients which function to provide lubricating and cooling properties throughout the different temperature ranges by their ability to melt and flow under frictional heat and to provide a method of drawing metal whereby the workpiece and die are subjected to a stepwise lubricating action of materials which function to give optimum lubricating properties throughout the different temperatures.

Another object is to provide a process of drawing and forming metal wherein a smooth finish is obtained on the drawn article and wherein the residual fusible integral film on the metal forms a desirable base for paint or enamel coatings so that the drawn article may be painted without the necessity of first cleaning the surfaces thereof or so that the fusible lubricant coating acts as a prime coating to provide superior adhesion of subsequent paint or lacquer films.

In accordance with the present invention, I form an integral meltable film directly on the surface of the workpiece, and coat this with a suitable organic binder through which is disposed pigments of distributed melting points. The integral coating formed on the surface of the work and the pigments in the binder are of materials having a hardness less than 5 on Mohs' scale and melting at temperatures below that of the die or the workpiece, whichever melts at the lower temperature. Likewise, the organic binder melts or decomposes at temperatures below that of the fusion of the fusible pigments. The melting points of the integral coating, organic binder, and incorporated solids are determined and arranged or graduated so that they melt in successive temperature ranges and there is a plastic lubricant btween the die and workpiece at all temperatures and stepwise lubrication is achieved.

The process thus embraces three basic, co-acting factors. In the first place, there is an integral coating formed directly upon the work. In the second place, an organic binder is disposed over the work. And thirdly, meltable pigments are dispersed in the organic binder to further lubricate and facilitate drawing and deformation of the work. In this way, the work is lubricated and protected throughout the drawing or forming process and superior draws are made possible.

Various materials and processes can be used to form the coating directly on the work surface and several resultant coatings can be employed. The qualifications of the integral coating or fixed film are that it must have a hardness less than 5 on Mohs' scale and that it will be plastic at temperatures below that at which the work or die welds.

INTEGRAL COATINGS

The formation of integral coatings on ferrous metals is brought about by an unusual electrochemical phenomenon. The usual corrosion of metals involves a well understood galvanic action between local cells or couples on the metal surface in which specific areas of the metal become anodic because of differences in chemical composition, intergranular strain, or local oxygen concentration, and iron goes into solution and the equivalent hydrogen ions are discharged at the less reactive cathodic areas.

The formation of tarnish films and integral coatings on polyvalent metals involves the Wagner electrolytic theory. C. Wagner studied this phenomenon and proposed an explanation reported in the transactions of the Faraday Society 34,851 (1938) and elsewhere. Unlike the local galvanic cells existing in the usual corrosion of metals, the corrosion produce or tarnish film is built up by a mechanism wherein the metal-to-film interface becomes the anode and supplies cations and electrons for outward diffusion, and the attacking film substance-to-environment interface becomes the cathode and supplies anions for inward diffusion. The growing film thus acts as both the internal and external circuits of a closed cell. The internal cell circuit is made possible by the insoluble iron compounds acting as a semi-conductor, while the conducting electrolyte in the film pores and capillaries furnishes an external circuit. The Wagner tarnish mechanism requires an attack by a diacidic metallic precipitating reagent in order to form the semi-conducting metallic component of the internal circuit. Thus, when the polyvalent metal is ferrous, the integral coating will always contain iron salts. The cathodic film-to-solution interface contains the discharging hydrogen, so that any depolarizer in the solution effectively accelerates the coating action.

The principal object of this invention is to utilize the Wagner mechanism to convert an otherwise refractory metal surface into an integral film of suitable compounds that will absorb and tenaciously hold a thermoplastic lubricant film containing other fusible pigments.

When such a film is to be formed in aqueous media, the diacidic precipitating reagent can be selected from the difluorides, the various dihydrogen phosphates, the dicarboxylic organic acids, and the diabasic inorganic sulfur containing acids ranging from hydrogen sulfide through sulfoxylic to the various polythionic acids.

Tarnish films of mixed oxides are also formed in the gaseous phase by the Wagner mechanism but I prefer to form sulfide layers, because of their fusibility.

Another modification of Wagner film formation involves the use of molten salts containing active sulfur which also produces fusible iron sulfide layers on ferrous metals that can be used as a lubricant undercoat.

IRON SULFIDE COATINGS

The most versatile lubricant base integral coating is that consisting principally of iron sulfide since it can be applied in either aqueous, gaseous, or molten salt media.

When ferrous metals are to be coated with a fusible integral iron sulfide film in aqueous media, I utilize an acidic solution containing colloidal sulfur, sulfur dioxide, and a mixture of polythionic acids. Such a solution can be prepared by the acid decomposition of unstable inorganic sulfur compounds by any of the following methods:

1. Sodium thiosulfate or sodium polythionates decomposed by preferred dibasic acids which are also coating agents.
2. Decomposition of equimolar $H_2S$ and $SO_2$ in aqueous acid solution to give Wackenroder's solution.
3. Hydrolysis of sulfur mono-chloride emulsified in a dibasic acid solution to form polythionic acids.
4. Interaction of wettable sulfur and sulfur dioxide in a solution containing a dibasic coating acid.

Integral ferrous sulfide films can also be formed on "sull" or iron hydroxide coated ferrous metal by converting the hydrated iron oxide film to iron sulfide by dipping in a hot aqueous alkaline polysulfide solution.

When ferrous metals are filmed with a layer of sodium thiosulfate or an equivalent decomposable sulfur salt, the metal can be coated with an integral coating of iron sulfide by heating the filmed metal above the initial melting point of the hydrated salts which melt in their water of crystallization. Likewise, a molten salt bath containing active sulfur can be utilized. When ferrous metals are to be coated with a sulfide coating in gaseous media, a reducing atmosphere containing sulfur vapor is used and either the bare iron surface is filmed with iron sulfide or the hot mill scale on the metal surface from previous operations can be converted to iron sulfide to act as a lubricant undercoat using a sulfur or phosphorus halide catalyst if required.

INTEGRAL PHOSPHATE AND OXALATE COATINGS

Two types of phosphate coatings are utilized as lubricant bases in metal drawing and cold extrusion. The first type is a light coating of about 25 to 150 mg. per sq. ft. formed by treating steel surfaces in a hot aerated or accelerated aqueous solution of 1 to 5 per cent sodium or ammonium dihydrogen phosphate. The second type is a heavy coating of about 200 to 1000 mg. per sq. ft. of mixed zinc and iron phosphates formed by treatment of steel surfaces in hot aqueous acidulated 1 to 5 per cent zinc dihydrogen phosphate accelerated by a strong oxidizing agent such as chlorate, persulfate, hydrogen peroxide, or a mixture of nitrate and nitrite. The phosphate coatings from these baths are heavier because free acid is consumed by the iron surface acting as anode in the Wagner mechanism so that zinc phosphate precipitates upon the work along with the iron phosphate formed by the neutralization of the free acid essential to zinc phosphate solubility. The amount of iron dissolved as anode in a zinc dihydrogen phosphate bath has been reported by Murphy and Streicher who showed (Proceedings Amer. Electroplaters Soc., p. 288; 1948) that an average phosphate coating from a zinc phosphate bath had a coating thickness of 0.055 mm. which represented an etched depth of 0.050 mm. and a dimensional increase of only 0.005 mm.

When a phosphate undercoat is desired as a component of my stepwise lubricant film, I can use any of the various proprietary coating baths in the patent literature such as those of Tanner and Lodeesen U. S. Patent No. 1,911,726, or Romig Patent No. 2,132,439; or I can use certain novel baths using Roussin's salts or nitrosyl chloride as the accelerator; or a novel bath of immersion copper plate codeposited with iron phosphate which acts both as a galvanic accelerator and a low frictional surface component.

Similarly, the proprietary oxalate coating baths such as that of Curtin and Kline U. S. Patent No. 1,895,568 or of Tanner U. S. Patent No. 1,911,537 can be used to obtain an integral oxalate coating as a component of a stepwise lubricant film. A novel method of obtaining an integral oxalate is to thermally decompose an aqueous layer of ferric oxalate, calcium chloride and oxalic acid upon the work to form an insoluble film of mixed calcium and ferrous oxalates.

When an oxalate undercoating is used as a component of a stepwise lubricant, it is most desirable to convert the film to a more fusible form by dipping the coating in a hot alkaline aqueous solution of a sulfide, borate, or phosphate to convert iron oxalate to a fusible iron borate, sulfide, or phosphate and to a meltable sodium oxalate which in turn is thermally decomposed to fusible sodium formate and sodium carbonate under frictional heat.

The various methods of converting a refractory ferrous metal surface to a fusible iron compound which will imbibe and anchor a stepwise lubricant composition is illustrated in the following examples:

A sulfide coating bath for stainless steel was made up as follows:

EXAMPLE I.—SULFIDE COATING ON STAINLESS STEEL

| | Molar | Wt. Oz. Per Gal. |
|---|---|---|
| Iron chloride ($FeCl_2H_2O$) | 0.3 | 5.0 |
| Fluoboric acid (50% $HBF_4$) | 0.3 | 6.0 |
| Sodium thiosulfate ($Na_2S_2O_3.5H_2O$) | 0.05 | 1 |

The sodium thiosulfate was added to the aqueous bath after it was made up, and it was converted to polythionic acids, sulfur dioxide and colloidal sulfur in equilibrium, to make a sulfide coating bath. Various other additions would produce the same polythionic acid equilibrium that is required for an iron sulfide coating bath, but the thiosulfate addition has the advantage of convenience.

The stainless steel coating bath is heated to between 115° F. and 135° F. a lift of previously pickled 18–8 stainless steel tubes were immersed in the bath for six minutes, and removed to drain the points of the tubes to assure inside diameter coating, and the tubes again immersed in the solution for six more minutes to complete the coating operation. The lift of tubes were again drained, and then rinsed in warm running water. The tubes were then hot rinsed in a 4 oz. per gal. solution of lime sulfur at 180° F. to neutralize and sulfurize any residues in the coating. The stainless steel tubes had a soft black sulfide coating. These sulfide coated tubes were then lubricated with the drawing composition shown in Example XIII, after which they were dried and successfully drawn to a 38 per cent reduction at a speed of 50 feet per minute to produce a bright unscratched surface.

VAPOR PHASE SULFURIZING

Vapor phase or gas-sulfurizing reaction can also be used to coat the metal with a sulfide film. The reaction is carried out by subjecting the work to sulfur or sulfur containing compounds in a heated reducing or non-oxidizing (inert) atmosphere. The sulfur can be applied as a coating before heating the work, or bled into the reducing atmosphere from a separate vapor generator. Hydrogen, hydrocarbon gases, carbon monoxide, ammonia or the oil vapors or other vapors commonly used for reducing atmospheres in the bright annealing of ferrous metals are satisfactory as reducing atmospheres during the reaction between sulfur and the ferrous metal. The attack of iron by sulfur begins at about 400° F. and increases rapidly up to about 950° F.

One advantage of my vapor phase sulfurization treatment in a reducing atmosphere is that I may utilize metal from which the scale has not been removed as well as clean metal. Instead of removing the scale with an acid or surface treatment, I am able to convert the scale directly into the desired ferrous sulfide. A trace of water or water vapor to initiate the reaction is usually necessary in order to obtain efficient reduction of the iron oxide of the scale to ferrous sulfide. With high chromium and stainless steels, a catalyst such as phosphorus, halogen, a phosphorus or a sulfur halide or other suitable corrosive compound containing such elements is desirable to promote the reaction.

The atmosphere itself should be a reducing or a neutral, non-oxidizing atmosphere. An oxidizing atmosphere forms hard, undesirable ferric oxide and sulfide compounds such as iron pyrites or magnetic iron scale.

EXAMPLE II.—SULFURIZING IN AMMONIA ATMOSPHERE

Hot rolled 18–8 stainless steel rod coated with mill scale is placed in an annealing furnace in an atmosphere of 75 per cent disassociated ammonia and 25 per cent nitrogen and heated up to 1250° F. Free sulfur vapor is introduced from a generator containing boiling elemental sulfur and sulfur monochloride (liquid $S_2Cl_2$) is separately dripped into the furnace to furnish a sulfur halide catalyst to reduce the scale and assist its conversion to iron, chromium and nickel sulfides. The furnace temperature is kept between 1250° and 1800° F. for 10 to 25 minutes and then the work is removed. It is found to be coated with a relatively thick, fixed layer of mixed metal sulfides.

EXAMPLE III.—SULFURIZING IN BURNER GAS ATMOSPHERE

The work is placed in an atmosphere of exhaust burner gas containing nitrogen, $CO_2$ and excess air and heated up to between 900° and 1300° F. Sulfur vapor from a vaporizer is bled into the mixed stack gases where it combines with the oxygen of the excess air to produce a reducing and sulfurizing atmosphere to form a complex layer of iron sulfide on the ferrous surface after a few minutes exposure.

SULFURIZING BY THERMAL DECOMPOSITION OF A SULFUR COMPOUND

Another method of forming an integral ferrous sulfide coating upon ferrous metals is to cover the work with an alkaline layer of a sulfurizing agent and then heat the work in an annealing furnace, or a flash baker.

After steel has been hot rolled and initially shaped, the pieces have to be annealed to restore the ductility for further cold work. In the vast majority of cases, the anneal is performed in an uncontrolled furnace at atmospheric pressure so that the work becomes heavily scaled and must be pickled before further cold work or drawing can be performed. When the work is covered with an alkaline film of a sulfurizing agent and heated, however, the heavy scaled layer on the hot rolled steel is converted to ferrous sulfide and the work made ready for cold drawing and shaping. In this way, I eliminate the pickling step and utilize the annealing step to deposit a layer of ferrous sulfide on the metal.

The alkaline sulfurizing agent consists of a fusible alkali metal salt and a reducible sulfur compound that will convert the ferrous layer to iron sulfide and alkali ferrates when heated to a red heat and thus give an integral coating which can be cold worked without harming the working tools and dies. The magnetic iron oxide usually formed during hot rolling and annealing is highly abrasive to tools and dies. In addition to the fusible alkali salts and sulfurizing agents, fusible pigments can be incorporated or dispersed into the alkaline layer. A combination of pigments with an alkali coating is preferred for carbon steel while an unpigmented film can be used for stainless steel.

A suitable alkaline type coating is given below. The mole fraction of each chemical is given so that chemically equivalent compounds can be readily substituted by anyone skilled in the art.

EXAMPLE IV.—COATING FOR SULFURIZING DURING ANNEAL

| | Molarity | Typical Mix, Parts Dry Wt. |
|---|---|---|
| Sodium hydroxide | 0.2 | 8 |
| Sodium carbonate | 0.1 | 11 |
| Sodium thiosulfate | 0.1 | 25 |
| Sodium Metasilicate or Trisodium phosphate | 0.1 | 38 |
| Sulfur | 0.3 | 10 |
| Starch | | 8 |

This is made up into a 15 per cent to 33 per cent aqueous solution and applied to the work by dipping in the hot solution prior to annealing. Tenth molar sodium borate or sodium silicate can be used as a fusible alkali salt component in place of the 0.1 mole tri-sodium phosphate shown. Likewise, the chemical equivalent sodium sulfide, sodium sulfite, polysulfide, or polythionate can be substituted for sodium thiosulfate. The free sulfur in the above formula will be taken up in any case to form sulfides and polythionates. This film has additional complex chemical reactions when the work is heated. Iron sulfide and alkali ferrates are formed and when phosphates are used as the fusible salt, it is believed that some thiophosphates are formed. When sodium silicate is used as the fusible salt, certain ultramarine type silicates are formed.

The work is dipped in the solution which is heated up to 180°–200° F. and the hot solution allowed to dry on the work before being placed in an annealing furnace or passed through a continuous open flame gas annealer.

EXAMPLE V.—INTEGRAL IRON FLUORIDE COATING

Another readily applied integral coating is an iron fluoride layer. This is applied by immersing the work in a solution of sodium acid fluoride with sodium phosphite or sodium sulfite as the accelerator as follows:

Dissolve 8 to 32 ounces of sodium bifluoride and ¼ to ½ ounce of sodium phosphite $(NaH_2PO_2.H_2O)$ or sodium sulfite in each gallon of water. Immerse the work in this solution maintained between 120° and 160° F. for 5 to 15 minutes and then dry. This will form an adherent integral coating of iron fluoride, containing some ferrous phosphite or sulfite.

INTEGRAL PHOSPHATE COATINGS

A predominately iron phosphate film can be formed on ferrous stock by dipping it in solution of a diacidic phosphate such as sodium dihydrogen phosphate, potassium dihydrogen phosphate, ammonium dihydrogen phosphate, magnesium dihydrogen phosphate or calcium dihyrogen phosphate accelerated with an oxidizing or reducing agent. Suitable oxidizing agents are sodium chlorate, sodium nitrite, sodium nitrate, hydrogen peroxide, potassium persulfate, picric acid, quinone, and various other chlorates, bromates, and iodates. Likewise, suitable reducing agents are sodium sulfite, sodium thiosulfate, and sodium phosphite.

EXAMPLE VI.—IRON PHOSPHATE COATING

| | Parts |
|---|---|
| $(NH_4)\ H_2PO_4$ | 75 |
| $CaCl_2$ | 11 |
| $H_2O$ | 14 |

This is made up 5 per cent by volume into an iron phosphating solution. This bath could be accelerated by bubbling in gaseous nitrosyl chloride or by adding aqueous nitrobetaine, or NOCl amine complexes or Roussin's salts which are nitroso complexes of iron and sulfur. These are further described on page 678 of the Fritz Ephraim's Inorganic Chemistry, 4th ed. (1943). This is an improvement to the Glen L. Williams Patent No. 1,514,494 which disclosed phosphating solutions containing an unstable mixture of aqua regia and Steffan's sugar beet waste as accelerators. Zinc di-hydrogen phosphate or manganese dihydrogen phosphate can be used in place of the mono-ammonium phosphate shown in the foregoing example if a heavier mixed zinc or manganese and iron phosphate is required.

EXAMPLE VII.—COPPER IMMERSION PHOSPHATE

| | Per cent |
|---|---|
| Mono-sodium phosphate | 3 |
| Copper sulfate | 0.1 |

This bath should be maintained at around 180 F. The integral coating of immersion copper mixed with copper and iron phosphates formed by immersing the work in this bath forms an excellent base for any subsequent lubricant coating.

EXAMPLE VIII.—ZINC PHOSPHATE BATH

Solutions of manganese phosphate, cadmium phosphate, and zinc phosphate will form heavier integral lubricating coatings comprising iron phosphate when accelerated with sodium nitrate or nitrite, hydrogen peroxide, or sodium chlorate than the previous iron phosphate coatings. Such heavy coatings are obtained by various prior art methods such as the following:

| | Per cent |
|---|---|
| $Zn\ (H_2PO_4)_2$ | 3 |
| $NaClO_3$ | 0.6 |
| $H_3PO_4$ | 0.5 |

Maintain this bath at 160° to 180° F. and immerse the pickled stock for 5 to 10 minutes to form an integral coating of mixed iron and zinc phosphates.

Phosphate coatings are particularly valuable for drawing and cold working of metal because after the drawing or cold working has been completed, the phosphate coating forms a protective and anti-corrosion layer. It is also a very good base over which to apply the binders used in my stepwise lubricants. The phosphate baths, however, do not coat over stainless steel, so that oxalate, sulfide or fluoride baths must be used on these alloys.

INTEGRAL ORGANIC ACID COATINGS

Other integral coatings can be formed on the metal by treatment with selected organic acids. This process is fully explained in Patent No. 1,911,537 to Robert Tanner. Briefly, it consists of immersing or spraying the metal with a hot solution of aliphatic series acids with dicarboxyl groups or hydroxydicarboxyl groups or with aromatic series acids with one carboxyl group or sulphonic acids. The reaction is preferably accelerated with an oxidizing agent such as manganese dioxide or sodium sulfite and varies with each acid used. The best of the pure hot solutions are oxalic, malonic, tartaric, salicyclic, gallic, and diglycollic acids.

The coatings formed are mainly iron salts of the acids used. Thus oxalic acid forms ferrous-ferric oxalate, tartaric acidferrous-ferric tartarate and so forth. These organic iron salt films are thermoplastic or meltable by secondary reactions largely based upon the splitting off of fusible organic acids under heat, but augmented by the termal formation of fusible sodium formal and sodium carbonate. In addition, the strong reducing action of the termally decomposed organic iron salts causes the formation of fusible ferrous oxide melting at 1420° C. instead of the infusible ferric oxides. While such organic iron coatings are fluxed by binder-lubricants such as soap-borax mixtures and form additional low melting eutectics with any residual ferrous oxide or carbonate; it is preferable to rinse the integral organic iron coatings in hot aqueous solutions of an alkaline sulfide, borax, or disodium phosphate to both imbibe fusible flux salts and to form fusible iron salts and fusible sodium salts by ion exchange.

EXAMPLE IX—OXALATE COATING BATH

Prepare an aqueous solution of one part of sodium sulfite to fifteen parts of oxalic acid with preferably a small amount of manganese dioxide, one fortieth as much manganese dioxide as oxalic acid being a good ratio. The work is dipped in this solution at room temperature or slightly warmer, and the coating should form in a minute or so.

MELTABLE PIGMENTS FOR STEPWISE LUBRICATION

According to my present invention, the fixed integral films previously described are coated with a binder through which is distributed various meltable pigments. The pigments must have a Mohs' hardness of less than 5 and melt below the melting point of the work or the die, whichever is lower. The pigments generally melt above 500° C. and are various soft and fusible metal compounds.

The pigments in each lubricant are selected in relation to the integral film and binder so that there is effective stepwise or graduated lubrication between the work and die throughout the great portion of the drawing operation. Thus, the binders usually melt below 200° C. to furnish initial lubrication, so that the pigments selected should melt between 200° C. and 1300° C. or roughly, the melting point of the work if it is low carbon steel. Likewise, the integral film will usually melt around 900° C. if a phosphate and around 1050° C. if a sulfide. For this reason pigments melting between 900° C. and 500° C. are selected for incorporation in the binder.

The choice of the best combination of integral coating and stepwise lubricant is contingent upon the amount of reduction required in the forming operation. In general, a light reduction of 15 to 25 per cent can be taken upon work coated with a conventional iron phosphate coating of 50 to 150 mg. per sq. ft. or the equivalent light sulfide or oxalate coating. For a heavier draft of 30 to 50 per cent, a heavy zinc (and iron) phosphate, iron sulfide, or iron oxalate coating of 200 to 1000 mg.

per sq. ft. is to be preferred. With a light coating of iron phosphate or its equivalent that will undergo a 15 to 25 per cent reduction, a dry lubricant film obtained by immersing the pre-coated work in a hot aqueous solution of 2 ounces per gallon of sodium tallow soap and 10 ounces per gallon borax, then draining and drying the work, is very satisfactory. To draw the same piece to a greater reduction of, for example, 30 to 40 per cent it would be preferable to apply the heavier zinc phosphate coating or its equivalent iron sulfide or oxalate layer, and to film the heavier undercoating by immersion in a hot aqueous solution containing 3 ounces per gallon sodium tallow soap, 16 ounces per gallon borax, and 2 ounces per gallon precipitated chalk, or an equivalent fusible pigment. The precipitated chalk reacts in the hot borax solution to form a fusible shell of sodium carbonate and calcium borate over each minute particle and is thus equivalent to a fusible pigment.

If it were necessary to draw this same workpiece to an extreme reduction of 50 to 65 per cent, or to make more than one reduction without recoating the piece, it would likewise be desirable to apply a heavy zinc phosphate or an equivalent heavy undercoating, but an initial water insoluble stepwise lubricant would be first applied to the heavy integral undercoating as a solvent paint or water emulsion consisting of thinner, a thermoplastic binder, and fusible pigments. When this initial water insoluble stepwise lubricant film has dried or set-up, the work is then coated with an aqueous soap and borax type lubricant, and drawn to the extreme reduction. When such duplex lubricant layers are used in severe or multiple drafting, the water soluble stepwise lubricant is rolled back into the die throat and the water insoluble thermoplastic binder and fusible pigments are forced into the drawn surface to prevent any metal-to-metal contact, and to leave a residual stepwise lubricant film that can be recoated with the water soluble stepwise lubricant, and again drawn. This duplex method is shown in Examples XV and XVI.

As a production cost factor, any appreciable increase in drawing speed or reduction will absorb any reasonable expenditure for properly coating the work and using the best suited lubricant.

Table I.—Fusible Pigments

| Pigment | Formula | Mohs' Hardness | Melting Point, ° C. |
|---|---|---|---|
| Aluminum stearate | $Al(C_{18}H_{35}O_2)_3$ | 1.0 | 180 |
| Antimony oxide | $Sb_2O_3$ | 2.5–3.0 | 656 |
| Antimony sulfide | $Sb_2S_3$ | 2.0 | 550 |
| Arsenous oxide | $As_2O_3$ | 1.5 | 315 |
| Arsenous sulfide | $As_2S_3$ | 2.0 | 307 |
| Barium pyrophosphate | $Ba_2P_2O_7$ | 3.0 | 980 |
| Bismuth sulfide | $Bi_2S_3$ | 2.0 | 685 |
| Boric anhydride | $B_2O_3$ | 3.0 | 577 |
| Calcium tetraborate | $CaB_4O_7$ | 3.0 | 986 |
| Calcium stearate | $Ca(C_{18}H_{35}O_2)_2$ | 1.0 | ---------- |
| Cadmium pyrophosphate | $Cd_2P_2O_7$ | 3.5 | 900 |
| Cobalt sulfide | CoS | [1] 4.0 | 1,116 |
| Chromium fluoride | $CrF_3$ | [1] 4.5 | 1,000 |
| Copper Powder | Cu | 2.5–3.0 | 1,003 |
| Copper sulfide | $Cu_2S$ | 2.0 | 1,130 |
| Ferrous sulfide | FeS | 3.5–4.0 | 1,193 |
| Ferrous fluoride | $FeF_2$ | 3–4 | 1,000 |
| Ferrous phosphate | $FeHPO_4$ | 2–3 | 1,050 |
| Lead Borate | $PbB_4O_7$ | 1.5–2.0 | 278 |
| Lead Chromate | $PbCrO_7$ | 2.5–3.0 | 844 |
| Lead Molybdate (wulfenite) | $PbMoO_4$ | 2.75 | 1,068 |
| Lead oxide (litharge) | PbO | 2.5 | 888 |
| Lead phosphate | $Pb_3(PO_4)_2$ | 3.0 | 1,014 |
| Lead metasilicate | $PbSiO_3$ | 3.0 | 766 |
| Lead sulfide (Galena) | PbS | 2.5 | 1,120 |
| Manganese pyrophosphate | $Mn_2P_2O_7$ | 3.5 | 1,196 |
| Manganese borate | $MnB_4O_7$ | 3.5 | 950 |
| Mercury sulfide (vermilion) | HgS | 1.0–1.5 | 446 |
| Mercury chloride (calomel) | HgCl | 1.0–2.0 | 302 |
| Molybdic oxide | $MoO_3$ | 2.0 | 795 |
| Nickel sulfide | NiS | 3.0–3.5 | 797 |
| Sulfur | S | 1.5–2.0 | 120 |
| Molybdenum sulfide | $MoS_2$ | 2.0 | 1,185 |
| Vanadium pentoxide | $V_2O_5$ | 2.5 | 690 |
| Zinc palmitate | $Zn(C_{16}H_{31}O_2)_2$ | 1.0 | 419 |
| Zinc borate | $3ZnO-2B_2O_3$ | 3.0 | 980 |
| Zinc phosphate | $Zn_3(PO_4)_2$ | 3.5 | 900 |

[1] About.

Various binding materials are usable in conjunction with the present invention. The binder serves as a vehicle for incorporating the meltable pigments to distribute them uniformly over the work surface and to protect and lubricate the inner integral film of phosphate or sulfide by acting as an initial lubricant between the work and die over the lower temperature ranges.

The binding material is preferably a thermoplastic natural or synthetic resin having a melting or softening point below 300° C. The choice of vehicles and pigments is usually determined by the expenditure that can be made and the severity of service required. When the service is not so severe and the expenditure is limited, a heat labile binding material such as the organic colloids which decompose at relatively low temperatures may be used and the principal reliance for lubrication based upon the fusible pigments. On the other hand, when there is severe service and suitable expenditures can be made, a fusible natural, synthetic or resinous material is preferred.

Corrosive vehicles, i. e., those containing sulfur or chlorine, such as solutions or dispersions of chlorinated diphenyl (Arochlor), chlorinated rubber (Tornesit), ethylene polysulfide polymers, chlorinated paraffin, 2-chlorobutadiene polymer (neoprene) and vinyl chloride are especially desirable in that they tend to bond directly to the metal through their polar linkages. In addition, their decomposition under frictional heat will cause the formation of a fusible iron chloride or sulfide as a secondary lubricant.

In lubricating compositions of the present invention, the proportions of pigment and vehicle may be varied widely to obtain the desired fluidity. Usually, it is preferable to have 10 to 30 parts of vehicle or binder for each 100 parts of composition, the remainder being pigment and solvent. The vehicle is thus considered as the residue in the fixed film after evaporation of the solvent. The pigments generally comprise from two to five times the amount of the vehicle.

Examples of suitable natural and synthetic thermoplastic resins which may be utilized in conjunction with the suitable fluidity-imparting agent, such as a solvent, plasticizer, or dispersing mixture are listed below:

Table II

| | Softening Point and Melting Range, ° C. |
|---|---|
| Resins-Synthetic: | |
| Acrylic ester polymers (polymethyl methacrylate type) | 105–120 |
| Alkyd type, non-oxidizing (glycerol-phthalic anhydride type) | 75–115 |
| Alkyl type, oxidizing (unsaturated fatty acids) | 90–100 |
| Alkyl type, modified (rosin, etc.) | 80–110 |
| Cellulose acetate (Aceto-butyrate) | 60–120 |
| Cellulose nitrate | 60–90 |
| Coumarone-indene | 75–100 |
| Cycloparaffin (napthenes or completely saturated carbocyclic compounds) | 100–110 |
| Ester Gum | 70–100 |
| Ethyl cellulose | 100–130 |
| Styrene polymer | 82–95 |
| Toluene sulfonamide formaldehyde | 70–100 |
| Polyvinyl chloride | ---------- |
| Polyvinyl acetate | 100–160 |
| Chlorinated rubber | ---------- |
| Resins-Natural: | |
| Amber | 250–300 |
| Asphaltum | 90–100 |
| Bitumen | 90–110 |
| Gilsonite | 116 |
| Natural resins (Dammar, Copal, etc.) | 85–150 |
| Rosin | 130 |
| Shellac | 110–150 |
| Waxes, natural | 40–80 |
| Waxes, petroleum | 25–60 |

All of the binders or resins listed above in Table II are meltable and thus form an additional lubricant for the work as the deforming operation progresses.

The resins listed below in Table III are suitable for use with a solvent, plasticizer, or dispersing mixture to give a binder, but they are thermosetting at higher temperatures and do not melt so that an additional lubricant should be used with them.

Table III.—Thermosetting Resins

Melamine or urea-aldehyde polymers
Casein-formaldehyde
Phenol-formaldehyde

Water soluble binders suitable for use with other water soluble or water insoluble pigments are listed below. These binders are divided into two groups, the lubricating or melting binders and the non-lubricating or charring binders which carbonize or decompose at elevated temperatures.

Table IV.—Water Soluble Lubricating Binders

Carbowax (a polyalkylene glycol ether)
Glycerol and glycol borates and phosphates
Glycol stearate
Polyalkylene glycol oleate or stearate
Sodium palmitate
Sodium stearate
Sodium oleate Water Soluble Non-Lubricating Binders Ammonium alginate
Casein
Dextrin (starch gum)
Gelatine and glue
Gum arabic, tragacanth, etc.
Methyl cellulose
Pectin
Polyvinyl alcohol
Hydroxy ethyl cellulose
Sodium glycolate
Sodium resinate Water Soluble Non-Lubricating Binders Sodium naphthenate
Starch When a water soluble, non-lubricating binder is used it is also necessary to use some sort of additional lubricant for the lower temperature ranges (100–400° C.). Good lubricants for this purpose are the various commercial drawing and cutting oils, lubricating oils, soaps of all kinds, especially high titre, high tallow soaps, soap and borax mixtures, and the various natural and synthetic waxes.

CONCLUSION

From the preceding discussion, it is evident that a wide variety of lubricant compounds and compositions can be formulated which utilize my invention. In all cases, the formula used should vary with the particular problem presented and the conditions under which it is used. In addition, the relative cost of the compounding materials should be influential in determining exact lubricant components.

In order to facilitate complete disclosure of this invention, I am listing a series of examples of the drawing or deforming of metal. It is understood that the invention is by no means limited thereby and that these are only typical formulas selected from the wide range of combinations of integral coatings and lubricants such as are above described.

EXAMPLE X.—THERMALLY FORMED OXALATE

A solution of the following composition was made up:

| | Oz. per gal. |
|---|---|
| Ferric oxalate 1.0 molar | 50 |
| Oxalic acid 1.0 molar | 17 |
| Calcium chloride 1.0 molar | 17 |

The above solution is heated to 115° F. and a yoke of pickled stainless steel rod immersed in the solution, and the excess solution allowed to drain off after a two minute immersion. There is no noticeable coating action in such a short immersion at such a low temperature, but a coating of insoluble ferrous and calcium oxalates are formed when the oxalate film is dehydrated in the flash baker. The film of insoluble oxalate is firmly bonded to the stainless surface. The dried oxalate coated wire is thereafter drawn through a plurality of successive dies with no further treatment by utilizing a stepwise box soap powder containing a flux and mineralizer and having the following composition:

| | | |
|---|---|---|
| Sodium stearate | 45 per cent | 0.15 molar |
| Sodium sulfite | 12 per cent | 1.10 molar |
| Borax | 38 per cent | 0.10 molar |
| Moisture | 5 per cent | |

This soap is made by crutching ground borax glass and anhydrous sodium sulfite into the sodium stearate after saponification to remove water and then pouring the molten mixture into frames, and grinding the dry soap into a powder.

EXAMPLE XI.—WATER SOLUBLE SULFIDING LUBRICANT

As aforementioned it is possible to form an integral ferrous sulfide coating on articles to be drawn with a reagent that will become also a water soluble stepwise lubricant, when the residual film is dried on the work. Such a combination coating and lubricating bath can be made up by dissolving 8 to 20 oz. per gallon of the following composition in hot water:

| | | |
|---|---|---|
| Diethylene glycol stearate or sodium stearate | | 20 per cent |
| Starch or polyvinyl alcohol | | 10 per cent |
| Boric acid $H_3BO_3$ | 0.48 molar | 30 per cent |
| Sodium thiosulfate, $Na_2S_2O_3.5H_2O$ | 0.16 molar | 40 per cent |

The bath is heated up to 180–200° F. and the degreased carbon steel work immersed in the hot solution for about five minutes, during which time a black iron sulfide film is formed on the surface by the polythionic acid decomposition products. The work is removed, then drained and dried, and the film remaining on the work is a stepwise lubricant by virtue of the polar stearate, protective colloid, and fusible flux salts comprising the dry homogeneous film. The reactions which take place are as follows:

(1)

$$4Na_2S_2O_3 + 12H_3BO_3 \longrightarrow 2Na_2B_4O_7 + 10H_2O + 4H_3BO_3 + \underbrace{4S + 4NaHSO_3}_{\text{Polythionate}}$$

(2) Decomposition on drying:

$$2Na_2B_4O_7 + 4H_3BO_3 + 4S + 4NaHSO_3 \longrightarrow 3Na_2B_4O_7 + Na_2S_4 + 4SO_2 \uparrow \text{(gas)}$$

The dried film therefore contains sodium tetraborate and sodium tetrasulfide in addition to the protective colloid and polar stearate lubricant. The coated metal is thereupon deformed by passing it through a die.

EXAMPLE XII.—WATER SOLUBLE PHOSPHATING LUBRICANT

Combination coating reagent and stepwise lubricant similar to that in Example X can be formulated to form an integral phosphate coating on carbon steel, and also deposit a stepwise lubricant film. Such a bath can be prepared by dissolving from 8 to 20 oz. per gallon of the following dry powder.

| | Parts |
|---|---|
| Diethylene glycol stearate or sodium stearate | 20 |
| Starch or polyvinyl alcohol | 10 |
| Mono-sodium phosphate, $NaH_2PO_4$—0.50 molar | 60 |
| Sodium thiosulfate, $Na_2S_2O_3.5H_2O$—0.17 molar | 40 |

The bath is heated up to 180 to 190° F. and the degreased articles (steel tubes in this instance) to be phosphated are immersed in the hot solution for about five minutes, during which time an integral iron phosphate coating is formed by the mono-sodium phosphate accelerated by sodium bisulfate acting as a hydrogen depolarizer. The reactions are clarified by these equations:

(1)

$$Na_2S_2O_3 + 3Na_2HPO_4 + 2NaH_2PO_4 + NaHSO_3 + S$$

Coating Acid Depolarizer (2) Decomposition on drying:

$$Na_2HPO_4 + 2NaH_2PO_4 + NaHSO_3 + S \longrightarrow 2Na_2HPO_4 + NaPO_3 + SO_2 \uparrow (gas) + S - 2H_2O$$

The dried coating film therefore contains two mols of disodium phosphate to one of mono-sodium phosphate so that I have an alkaline flux in addition to the colloidal sulfur, protective colloid and polar stearate lubricant. The articles thus coated with the integral undercoating of iron phosphate and with the superimposed fixed film of water soluble stepwise lubricant is thereupon drawn through suitable drawing dies to provide a reduction in size. Several passes are had without intermediate coating and the articles have a bright shiny surface. This combination of iron phosphate undercoating and water soluble stepwise lubricant is very satisfactory for drawing articles that are to be electroplated, and which must be grease free and easily cleaned.

It should be pointed out that both of the water soluble stepwise lubricants shown in Examples XI and XII tend to produce alkaline baths under continued use due to the neutralizing action of the iron being coated, and the breakdown of sodium thiosulfate to precipitated sulfur and volatile $SO_2$ to leave an alkaline $Na_2O$ residue. Thus, occasional acid corrections must be made to restore coating action, or else the sluggish coating bath can be made alkaline by caustic additions to become a stepwise lubricant similar to Example XIV and XV and a new coating bath made up to replace the acid depleted coating solution.

EXAMPLE XIII.—SOLUBLE SOAP AND BORATE PIGMENT

A water slurry containing 8 oz. per gallon of a sodium stearate soap and 8 oz. per gallon of calcium borate pigment is heated to 190° F. and steel blanks coated by immersing them five minutes in the soap-calcium borate slurry and the blanks drained and dried by a hot air blast. The filmed blanks are then deep drawn in a hydraulic press operated die, producing shells with an excellent finish. The drawn shells are then cleaned by swilling off in hot water.

EXAMPLE XIV.—SULFURIZING SOAP TYPE LUBRICANT

The work is dipped in the stainless steel coating solution of Example I, left in it for around five to fifteen minutes during which time a black sulfide coating is formed on it. It is then dipped in a 20 per cent water solution of the following dry powder, dried, and deformed by drawing through a die.

| | Molarity | Typical Mixture, Percent |
|---|---|---|
| Soap | 0.1 | 30 |
| Starch | | 5 |
| NaOH | 0.1 | 4 |
| $K_2CO_3$ | 0.05 | 7 |
| Sulfur | 0.3 | 9 |
| $Na_2S_2O_3$ | 0.1 | 20 |
| $Na_2B_4O_7$—anhydrous | 0.1 | 20 |
| $CaCO_3$ | 0.05 | 5 |

EXAMPLE XV.—EMULSION PAINT LUBRICANT

| | Pounds/parts |
|---|---|
| Antimony oxide (M. P. 315° C.) | 164 |
| Zinc borate (M. P. 980° C.) | 493 |
| Linseed oil modified Alkyd resin | 206 |
| Cobalt Linoleate (6% cobalt) | 2 |
| Oleic acid | 25 |
| Casein | 21 |
| 2-amino methyl propanol | 7 |
| Algin | 3 |
| Water | 392 |

The above ingredients are mixed in any desired order to provide an aqueous emulsion paint.

Low carbon steel sheet is first cleaned and then given a phosphatic paint base coating by treatment in a bath of calcium dihydrogen phosphate. The phosphated sheet is then painted with the antimony oxide-zinc borate paint given above. When the painted sheet is thoroughly dry and has formed a fixed solid film it is immersed in a solution of hot paraffin containing 30 per cent calcium stearate. This completely waterproofs the sheet and leaves a lubricating wax protective layer on the paint. The sheet is then deep drawn into a cylinder on a hydraulic press using a flowed water coolant and lubricant containing 2 oz. per gallon of sodium stearate and 2 oz. per gallon of borax. The drawn cylinder has a highly lustrous finish, free from galling or scratch marks so that a desirable finish may be applied by merely a dip or spray with a thin clear lacquer. This stepwise lubrication can be shown to consist of the following progressive melting cooling sequence:

(1) Paraffin melting at 50° C.
(2) Calcium stearate melting at 80° C.
(3) Water acting as coolant.
(4) Alkyd resin vehicle melting at 110° C.
(5) Antimony oxide melting at 656° C.
(6) Zinc borate melting at 980° C.
(7) The phosphate coating melting around 1000° C.

EXAMPLE XVI.—ETHYL CELLULOSE LUBRICANT PAINT

| | Parts |
|---|---|
| Ethyl cellulose | 16 |
| Hydrogenated rosin | 8 |
| Castor oil | 4 |
| Toluene | 54 |
| Hy-flash naphtha | 10 |
| Butanol | 8 |
| Ferrous sulfide pigment (M. P. 1193° C.) | 24 |
| Nickel sulfide pigment (M. P. 797° C.) | 24 |

The two sulfide pigments are milled into the heated ethyl cellulose and the mixture thus formed together with the rosin is dissolved in the solvent. The metal to be worked is first placed in a furnace and heated up to 900° F. in a controlled atmosphere of cracked natural gas. When the metal has reached a red heat sulfur vapor is introduced into the furnace in a sufficient amount to produce a black color over the surface of the metal. The metal is cooled in a reducing atmosphere and then coated with the above pigmented composition. The metal is then deep drawn into a cylinder on a hydraulic press using as a fluid flowed over the coated black an aqueous solution of coolant and lubricant of four ounces of diglycol stearate per gallon of water. The article produced has a black, shiny protective surface which can be coated with paints as desired without cleaning.

EXAMPLE XVII.—CHLORINATED RUBBER LUBRICANT

A chlorinated rubber, thermoplastic paint is made up having the following composition:

| | Parts |
|---|---|
| Chlorinated rubber | 20 |
| Chlorinated diphenyl | 8 |
| Turpentine | 35 |
| Hy-flash naphtha | 35 |
| Butanol | 2 |
| Cuprous chloride pigment | 40 |

This paint is used to coat a stainless steel rod previously sulfurized as by Example II. Cuprous chloride is used to pigment this formula since it is not adversely affected by any hydrogen chloride which might be evolved by the thermal decomposition of the chlorinated rubber.

The rod is drawn to 25 per cent reduction and still has a bright finish after drawing.

EXAMPLE XVIII.—EMULSION PAINT

| | Per cent dry weight |
|---|---|
| Calcium resinate | 4 |
| Calcium stearate | 4 |
| Paraffin wax | 10 |
| Emulsified by: | |
| Sodium stearate | 3½ |
| Sodium resinate | 3½ |
| Ferrous sulfide | 20 |
| Calcium sulfate | 30 |
| $Na_2B_4O_7.10H_2O$ | 25 |

This is to be considered as only illustrative of the emulsions that can be used.

EXAMPLE XIX.—BUMPER BAR FORMING LUBRICANT

Cold forming has replaced the former hot forging of automotive bumpers, so that the bumper bar stock can be machine polished in the flat, and the polished stock phosphated and coated with a water soluble stepwise lubricant that can be readily cleaned off so that no defective nickel plating will be caused by any lubricant residues. Since the deformation in this operation is great, it is preferable to use a medium phosphate coating, but since production time is of the essence, it is best applied by an accelerated zinc phosphate bath such as that in Example VIII.

After the bumper stock is phosphated and rinsed, a stepwise lubricant is applied by roller coating, and the applied lubricant film quickly dried by hot air blast or an infra red drier. A satisfactory composition is the following:

Soluble Bumper Lubricant

| | Molarity | Weight Percent Comp. |
|---|---|---|
| Sodium tallow soap | 0.15 | 10 |
| Carbowax 6000 | 0.001 | 6 |
| Potassium carbonate $K_2CO_3$ | 0.15 | 20 |
| Boric acid $H_3BO_3$ | 0.10 | 20 |
| Borax $Na_2B_4O_7.10H_2O$ | 0.10 | 38 |

The above dry powder is made up into a warm soft water solution at a concentration of about 14 oz. per gallon and the solution maintained between 160 and 175° F. for roller or drip application. This type of lubricant is disclosed in the Orozco and Henricks Patent No. 2,469,473.

EXAMPLE XX.—SOAP AND BORAX LUBRICANT

Carbon steel blanks for deep drawing were cleaned in an alkaline cleaner, rinsed, and dipped in cold 15 per cent muriatic acid to give a minute etch, again rinsed, and then coated in the copper immersion accelerated mono-sodium phosphate coating bath disclosed in Example VII.

After phosphating and rinsing, the blanks were coated by immersion in a boiling solution of 15 per cent sodium tallow soap and 85 per cent borax at a concentration of 1 pound per gallon, and allowed to drain and air dry.

The blanks thus coated were deep drawn into cylinders with excellent die life and very few rejects due to surface imperfections attributed to the drawing operation.

This type of lubrication is disclosed in the Whitbeck Patent No. 2,470,062.

EXAMPLE XXI.—ALKALINE RINSE

Deep drawing stock was phosphated with a light iron phosphate coating in the ammonium dihydrogen phosphate bath in Example VI, which bath also contains calcium salts as well as some iron salts held in solution by the chloride ion as the iron nitrosyl complex. In order to augment the thin iron phosphate coating and to gain additional film pigments, the coated work was not water rinsed in the usual manner. Instead, the coated work still filmed with the coating solution is dipped in a hot still solution of 4 to 6 ozs. 1 gal. of disodium phosphate, and held in the solution for three minutes so that all of the calcium and iron absorbed in the unrinsed coating will be precipitated as insoluble phosphate. The sodium phosphate treated work was then coated in the following sulfurizing soap lubricant, still without rinsing.

| | Molarity | Weight Percent |
|---|---|---|
| Sodium tallow soap | 0.067 | 20 |
| Starch | | 5 |
| NaOH | 0.10 | 4 |
| $K_2CO_3$ | 0.05 | 7 |
| Sulfur | 0.30 | 9 |
| $Na_2S_2O_3.5H_2O$ | 0.05 | 12 |
| Trisodium phosphate | 0.10 | 38 |
| Chlorinated phenol | .001 | 1 |
| Carbowax 6000 | | 3 |
| Pine oil | | 1 |

The work thus given the alkaline phosphate treatment had an improved undercoating film as evidenced by fact that the work so treated could be drawn to a greater reduction than identical work cold water rinsed after phosphating and coated with the identical lubricant.

EXAMPLE XXII.—SULFURIZING IRON HYDROXIDE COATINGS

Wire rod can be "sull" coated by allowing freshly pickled carbon steel to rust in the air while wet with water or a weak salt brine. Stainless steel can be provided with a hydrated oxide layer by dipping clean pickled stock in a fused sodium hydroxide bath containing about 10 percent sodium nitrate and maintained at 900° to 1000° F.

In either case, the hydrated iron oxide is converted to fusible iron sulfide mixture by immersion in a boiling polysulfide solution made up from 1 to 3 pounds per gallon of the following calcium sulfide coating:

| | Molarity | Weight Percent |
|---|---|---|
| Calcium hydroxide $Ca(OH)_2$ | 0.32 | 25 |
| Calcium chloride, $CaCl_2.H_2O$ | 0.16 | 20 |
| Sulfur flour | 1.25 | 40 |
| Starch | | 10 to 40 |
| Aryl-akyl sulfonate wetting agent | | 5 |

The brown iron hydroxide layer is thus converted to a black iron sulfide mixture forming an integral fusible coating over the work. The rod is removed from the bath after a 3 to 5 minute immersion, and the calcium chloro-sulfide layer dried on the work in a flash baker to become a lime substitute. The coated rod is then drawn through a stepwise lubricant box soap such as that disclosed in Example X. The finished wire has a bright smooth black surface completely free of scratches or imbedded lime particles.

EXAMPLE XXIII.—SULFURIZED OXIDE COATING FOR WIRE

Carbon steel wire is "sull" coated in the same manner as the previous example or stainless steel wire is given an oxide coating in a fused caustic bath, and rinsed off and dipped in a hot sulfurizing soap lubricant solution such as that disclosed in Example XIII. The coated wire is darkened by immersion in the hot solution, but the hydroxide undercoating is not completely blackened until the soap film is dried in a flash baker after being drained and air dried.

The integral sulfide coating and water soluble stepwise lubricant film formed in this manner is drawn through a stepwise box soap lubricant of the following composition:

| | Molarity | Weight Percent |
|---|---|---|
| Calcium stearate | 0.1 | 40 |
| Calcium hydroxide | 0.05 | 36 |
| Iron sulfide FeS | 0.05 | 24 |

The wire so treated and drawn has a bright gray finish free of any scratches or drawn in lime particles.

While in the aforementioned examples I have usually shown one fixed film over the integral coating of iron salt on the metal, I may use more than one film to obtain further benefits from stepwise lubrication. Thus, the surface of the steel to be worked may be treated with a solution such for example as the baths of Example I containing polythionate materials equivalent to Wackenroder's solution to form an integral adhered coating to obtain iron sulfide upon the material. The thus treated metal after rinsing may be then filmed by contacting it with an alkaline earth polysulfide solution containing a colloidal carbohydrate such as starch or polyvinyl alcohol and the like. After drying the latter film on the metal it may be then quickly immersed in an aqueous soap and borax film such as previously described to provide a second film over the previous polysulfide film. The material thus treated may then be dried and subjected to extreme cold work.

Although several embodiments of the invention have been herein shown and described, it will be understood that in accordance with the provisions of the patent statutes, numerous modifications of the construction shown may be resorted to without departing from the spirit of this invention.

What I claim is:

1. In the lubrication of a ferrous metal surface which is subjected to sliding friction, the steps which comprise forming on the surface an integral coating by subjecting the surface to sulfur in the presence of a reducing atmosphere, and thereafter disposing over said coating an adherent meltable film deposited from solution and containing a meltable organic binder that is solid at room temperature, and a finely divided inorganic solid compound insoluble in solutions of said binder and having a melting point below the melting point of iron and of the integral surface coating and a scratch hardness less than 5 on a Mohs' scale, whereby said integral coating is protected and also stepwise lubrication is effected when sliding friction occurs and finally working said metal surface and subjecting it to sliding friction.

2. In a process of working ferrous metal the steps which comprise forming on the surface of the metal an integral coating of hexagonal black ferrous sulfide and superimposing on the thus coated metal a fluid composition capable of drying to a solid meltable film and comprising at least one meltable and fusible solid inorganic compound distributed through a fluid vehicle containing an organic binding material, said inorganic compound being insoluble in said vehicle, being meltable at a temperature less than the melting point of the ferrous sulfide and having a Mohs' hardness not exceeding 5, drying said fluid composition to a solid film and finally deforming said metal.

3. In a process of deforming a ferrous metal surface, the steps which comprise forming on said surface an integral coating of a solid ferrous compound having a melting point less than that of the ferrous metal and greater than the temperatures at which hydrocarbon lubricating oils are stable and which has a scratch hardness of less than 5 on the Mohs' hardness scale, thereafter forming over said surface an adherent coating comprising an organic binder in a solid state but having a melting point lower than that of said ferrous compound of said integral coating, and a plurality of finely divided inorganic solids, at least one of which is an inorganic compound, which solids have a lower melting point than the melting point of said integral coating, said organic binder also having a melting point lower than that of said integral coating and that of said finely divided solids, and thereafter subjecting the metal to deformation, whereby said organic binder both protects said integral coating and cooperates therewith and with said finely divided solids to provide stepwise lubrication at different temperatures caused by said deformation.

4. The process of working ferrous metal which comprises forming on the surface of the metal a phosphate coating and superimposing thereon a fixed film of a composition comprising a solid meltable organic binding material containing distributed therethrough a solid inorganic compound meltable at a temperature below the melting point of the ferrous metal phosphate of said coating and having a hardness not exceeding 5 on the Mohs' hardness scale, and thereafter deforming the metal.

5. A method of treating ferrous metal prior to deformation thereof by drawing, which comprises subjecting said metal to contact with an aqueous solution comprising sulfur containing materials formed from sodium tetrathionate in the presence of boric acid to form an integral adherent coating comprising ferrous sulfide on the metal, drying over said integral coating an aqueous liquid comprising an organic water soluble film forming protective colloid and a meltable inorganic compound to form a film that is solid at room temperature, which is deposited from solution and which contains a meltable solid organic binder and a solid meltable inorganic compound having a scratch hardness of less than 5 on the Mohs' scale and a melting point less than the melting point of said integral coating and higher than the melting point of said organic binder and thereafter deforming the metal.

6. In the lubrication of metals, the method of forming a lubricant coating on ferrous metal surfaces by the steps which comprise subjecting the metal to contact with an aqueous acidic coating and etching bath containing polythionates to form an integral adherent coating containing iron sulfide upon the metal, the iron sulfide being derived from reaction of the bath upon the ferrous surface, then rinsing the coated metal and then filming the coated metal with an alkaline earth polysulfide solution containing a colloidal carbohydrate, drying the polysulfide and colloid film and then applying an aqueous soap and borax lubricant film over the previous polysulfide film and then drying the lubricant onto the coated metal surface.

7. In a process of working ferrous metal, the steps which comprise (1) forming on the metal surface an integral iron salt that has a lower melting point than the metal, (2) thereafter forming a meltable fixed film over said integral iron salt by coating the surface thereof with a film-forming, liquid composition containing a water-soluble organic binder that dries to a solid film and a meltable, solid inorganic compound, said inorganic compound and organic binder having melting points below that of the integral iron salt and having hardness less than 5 on the Mohs' hardness scale and (3) thereafter working the metal, whereby said solid film both protects said iron salt and cooperates therewith to provide, by difference in melting point, stepwise lubrication at the varying temperatures produced by the drawing operation.

8. In a process of working ferrous metal, the steps which comprise (1) forming on the surface an integral iron salt that has a lower melting point than the metal, (2) thereafter forming a meltable fixed film over said integral iron salt by coating the surface thereof with a film-forming liquid composition containing a water-soluble organic binder that is solid at room temperature and a plurality of solid meltable inorganic compounds distributed therethrough, said inorganic compounds and meltable binder having melting points below that of the integral iron salt and a scratch hardness less than 5 on the Mohs' hardness scale and (3) thereafter working the metal.

9. In a process of working ferrous metal, the steps which comprise (1) forming on the metal surface an integral iron salt that has a lower melting point than the metal and a hardness less than 5 on Mohs' hardness scale, (2) coating the surface thereof with a film-forming aqueous solution containing a water-soluble organic binder and a plurality of water-soluble inorganic compounds which remain distributed through the binder upon drying, said binder and inorganic compounds having melting points below the melting point of the integral iron salt and a scratch hardness less than 5 on Mohs' hardness scale, (3) drying said solution to form a solid-at-room-temperature, meltable, fixed film over said integral iron salt, and (4) thereafter working the metal.

10. A method of treating ferrous metal which comprises subjecting said metal to contact with an acidic aqueous solution containing (1) colloidal sulfur, sulfur dioxide, and a mixture of polythionic acids, (2) a water-soluble protective colloid, (3) a water-soluble, lubricating organic binder, and (4) a member of the group consisting of fusible borates and phosphates, so that an integral coating is formed on the metal while in solution, then with-drawing the metal from said solution so as to leave an overlying film of organic binder with fusible borates and phosphates therein drying said film on the ferrous metal, and thereafter deforming said metal with the aid of a die.

11. The method of claim 7 in which the integral coating comprises an iron sulfide.

12. The method of claim 7 in which the integral coating comprises an iron phosphate.

13. The method of claim 9, in which the integral iron salt is water insoluble.

*14. A bath for coating ferrous metal in preparation to a deforming action, comprising an acidic aqueous solution including a water-soluble protective colloid; a water-soluble stearate; a compound, the composition of which includes a radical selected from the group consisting of acidic phosphate radicals and acidic borate radicals; and a compound selected from the group consisting of sodium thiosulfate and the sulfur decomposition products of sodium thiosulfate.*

*15. A method of treating a ferrous metal having an integral-coating selected from the group consisting of iron sulfide coatings, phosphate coatings, and precipitated coatings of organic acid salts, provided thereon, comprising the step of superimposing a second coating over said integral coating; said second coating comprising an adherent meltable film containing a meltable organic binder that is solid at room temperature and an inorganic solid compound that is insoluble in solutions of said binder and having a melting point below the melting point of iron, and a scratch hardness less than 5 on a Mohs' scale.*

*16. As a new article of manufacture, a deformable ferrous metal, comprising, a ferrous metal base; an integral coating selected from the group consisting of iron sulfide coatings, phosphate coatings and precipitated coatings of organic acid salts, bonded to said ferrous metal base; and an adherent meltable film superimposed on said integral coating; and meltable pigments dispersed in said adherent meltable film; said pigments having a melting point below the melting point of said integral coatings and a scratch hardness less than 5 on a Mohs' scale.*

*17. A coating bath useable to provide an integral iron sulfide coating on a ferrous metal, comprising; an admixture of an aqueous, acidulated solution, including an unstable inorganic sulfur compound selected from the group consisting of sodium thiosulfate, sodium polythionate and sulfur mono-chloride with a water-soluble stearate.*

*18. A coating bath useable to provide an integral iron sulfide coating on a ferrous metal, comprising: an aqueous, acidulated solution including sodium thiosulfate and a water-soluble stearate.*

*19. As a new article of manufacture, a piece of blank metal stock for subsequent forming operations; said stock being coated with an integral phosphate coating; said integral phosphate coating being covered with an adherent meltable film superimposed thereon; said adherent meltable film having meltable pigments dispersed therein; said pigments having a melting point below the melting point of said integral coatings and having a scratch hardness less than 5 Mohs' scale.*

*20. As a new article of manufacture, a piece of blank metal stock for subsequent forming operations; said stock being coated with an integral oxalate coating; said integral oxalate coating being covered with an adherent meltable film superimposed thereon; said adherent meltable film having meltable pigments dispersed therein; said pigments having a melting point below the melting point of said integral coatings and having a scratch hardness less 5 on a Mohs' scale.*

*21. As a new article of manufacture, a piece of blank metal stock for subsequent forming operations; said stock being coated with an integral coating of a salt of an organic acid; said coating being covered with an adherent meltable film superimposed thereon; said adherent meltable film having meltable pigments dispersed therein; said pigments having a melting point below the melting point of said integral coatings and having a scratch hardness less than 5 on a Mohs' scale.*

References Cited in the file of this patent or the original patent

UNITED STATES PATENTS

| | | |
|---|---|---|
| 1,521,840 | Sheppard | Jan. 6, 1925 |
| 2,008,939 | Tufts | July 23, 1935 |
| 2,067,530 | Ihrig | Jan. 12, 1937 |
| 2,223,037 | Ihrig | Nov. 26, 1940 |
| 2,258,309 | Zimmer | Oct. 7, 1941 |
| 2,350,491 | Butler | June 6, 1944 |
| 2,366,208 | Montgomery | Jan. 2, 1945 |
| 2,469,473 | Orozoco et al. | May 10, 1949 |

FOREIGN PATENTS

| | | |
|---|---|---|
| 367,198 | Great Britain | Feb. 18, 1932 |
| 496,866 | Great Britain | Dec. 7, 1938 |
| 279,543 | Germany | Oct. 21, 1914 |

OTHER REFERENCES

Ephraim: "Inorganic Chemistry," pages 555–557, published 1943, 4th edition.